(12) United States Patent
Uenou (10) Patent No.: US 7,412,304 B2
(45) Date of Patent: Aug. 12, 2008

(54) POWER SYSTEM FOR AREA CONTAINING A SET OF POWER CONSUMERS

(75) Inventor: Yasuhiro Uenou, Tokyo (JP)

(73) Assignee: IP Power Systems Corporation, Tokyo (JP)

( * ) Notice: Subject to any disclaimer, the term of this patent is extended or adjusted under 35 U.S.C. 154(b) by 133 days.

(21) Appl. No.: 10/593,980

(22) PCT Filed: Mar. 24, 2005

(86) PCT No.: PCT/JP2005/005378

§ 371 (c)(1),
(2), (4) Date: Sep. 22, 2006

(87) PCT Pub. No.: WO2005/093924

PCT Pub. Date: Oct. 6, 2005

(65) Prior Publication Data

US 2007/0216515 A1    Sep. 20, 2007

(51) Int. Cl.
| G05B 11/01 | (2006.01) |
| G01R 21/00 | (2006.01) |
| G01R 13/04 | (2006.01) |
| G06F 15/00 | (2006.01) |
| H04K 1/00 | (2006.01) |
| H04L 9/00 | (2006.01) |
| H02J 1/10 | (2006.01) |
| H02J 3/14 | (2006.01) |
| G08B 23/00 | (2006.01) |
| G08C 15/06 | (2006.01) |

(52) U.S. Cl. .................. 700/295; 702/62; 702/188; 705/63; 705/412; 307/29; 307/39; 324/113; 340/310.11; 340/870.02

(58) Field of Classification Search .................. 700/22, 700/291, 293, 295; 702/61, 62, 188; 705/63, 705/412; 73/863; 307/18, 29, 31–33, 35, 307/38, 52, 115, 126; 315/307; 324/113, 324/126, 127, 500; 340/539.17, 539.22, 340/539.27, 310.11, 870.01–870.03, 628
See application file for complete search history.

(56) References Cited

U.S. PATENT DOCUMENTS 4,771,185 A * 9/1988 Feron et al. ................... 307/39

(Continued)

FOREIGN PATENT DOCUMENTS

FR    2567333 A1 *  1/1986

(Continued)

*Primary Examiner*—Crystal Barnes-Bullock
(74) *Attorney, Agent, or Firm*—Oliff & Berridge, PLC (57) ABSTRACT

There is provided a power system for an area containing a set of power consumers which can be applied to a collective housing consisting of a single or more buildings and can prevent power supply stop of a supply line having a higher priority. The system includes: means for cutting off each of the power supply lines in a single power consumer section from a remote management section by remote operation; means for setting the power consumption limit amount within the maximum power that can be supplied to the single power consumption section via the Internet; and means for setting the power supply priority for the power supply lines in advance and outputting an instruction to cut off power in the power supply line having the lowest power supply priority by the remote out-off means when the remote measurement value of the total power consumption amount exceeds the set value of the power consumption limit amount.

5 Claims, 6 Drawing Sheets

U.S. PATENT DOCUMENTS

| | | | | |
|---|---|---|---|---|
| 5,684,710 | A | * | 11/1997 | Ehlers et al. ................ 700/293 |
| 6,018,203 | A | * | 1/2000 | David et al. .................... 307/52 |
| 6,177,884 | B1 | * | 1/2001 | Hunt et al. ............ 340/870.02 |
| 6,528,957 | B1 | * | 3/2003 | Luchaco ..................... 315/307 |
| 6,603,218 | B1 | * | 8/2003 | Aisa ........................... 307/31 |
| 6,687,627 | B1 | * | 2/2004 | Gunn et al. ................... 702/61 |
| 6,842,706 | B1 | * | 1/2005 | Baraty ......................... 702/61 |
| 7,088,239 | B2 | * | 8/2006 | Basinger et al. ........ 340/539.17 |
| 2003/0225483 | A1 | * | 12/2003 | Santinato et al. ............ 700/295 |
| 2004/0230533 | A1 | * | 11/2004 | Benco ......................... 705/63 |
| 2007/0258574 | A1 | * | 11/2007 | Paraskevakos et al. . 379/221.11 |
| 2008/0042874 | A1 | * | 2/2008 | Rogai .................... 340/870.03 |

FOREIGN PATENT DOCUMENTS

| | | | |
|---|---|---|---|
| JP | U-57-130543 | | 8/1982 |
| JP | A-03-285518 | | 12/1991 |
| JP | B2-2997782 | | 11/1999 |
| JP | A-11-341707 | | 12/1999 |
| JP | A-2000-013933 | | 1/2000 |
| JP | A-2000-083323 | | 3/2000 |
| JP | A-2001-320832 | | 11/2001 |
| JP | A-2002-209335 | | 7/2002 |
| JP | 2003199249 A | * | 7/2003 |
| JP | A-2003-319572 | | 11/2003 |
| JP | A-2003-333749 | | 11/2003 |
| JP | A-2004-129477 | | 4/2004 |
| JP | A-2004-293336 | | 10/2004 |
| JP | A-2004-320849 | | 11/2004 |

* cited by examiner

POWER SYSTEM FOR AREA CONTAINING A SET OF POWER CONSUMERS

TECHNICAL FIELD

The present invention relates to a system for suitably supplying electric power to collective housing composed of a single or a plurality of buildings and managing the electric power, and to an electric power system for preventing as much as possible supply interruption of a supply line having a high order of priority individually set by a resident of the collective housing. Here, a phrase "quality of electric power" described in a previous application is reflected on the abovementioned "order of priority" set by the resident. The resident recognizes the value according to the order, and a supplier sets electric power fees according to the value.

BACKGROUND ART

Electric power is important as means for supplying energy, and a power failure due to supply shortage has been a problem caused by excessive electric power consumption. For example, the supplier's side cannot deal with a large consumption of electric power for air conditioning during summer, thereby causing a power failure in a particular region. A technology has been proposed which corrects such an unbalance between supply and demand of electric power and, furthermore, optimizes a balance between supply and demand of general energy including electric power by means of IT (Information Technology) which fully utilizes networks and computers.

In particular, in recent years, restrictions on business of selling electricity from a power producer and supplier (PPS) to any consumers are removed. Hence, in electric power supply, business providing new additional services attractive to customers has been sought. Under such circumstances, there is a demand, for technology to optimize electric power supply and demand, and improve the convenience of customers, and such technology has been being proposed.

In such proposals, electrical devices and electric power systems for a general-purpose power source or a house have been known which prevent as much as possible supply interruption of a supply line having a high order of priority set by a manager or a resident (see Patent Documents 1 to 8). For example, in Patent Document 1, an overload prevention control device is disclosed in which an electric apparatus having the lowest order of priority is first detached from a power source. Further, in Patent Document 2, a control device is disclosed which performs interruption according to the order of presettable priority of device interruption when the contract demand with an electric power company is exceeded.

Figure 4:
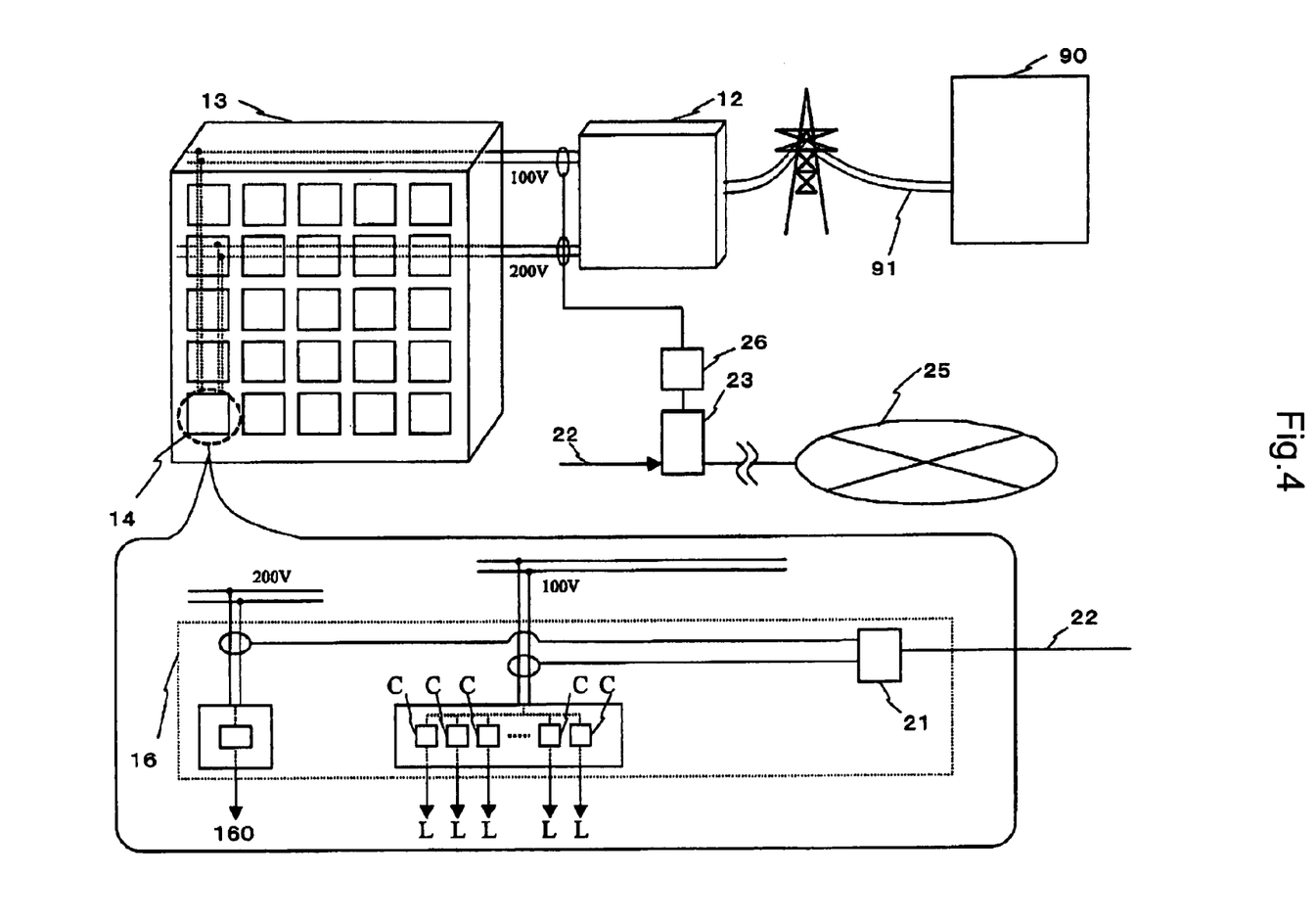
FIG. 4 illustrates a conventional electric power system for a collective housing unit.

However, for an electric power system for collective housing composed of a single or a plurality of buildings, or for an electric power system for a developing area, such as a narrow housing developing area within several hundred meters, in which a plurality of buildings are dispersed and scattered, an appropriate system for preventing as much as possible supply interruption of a supply line having a high order of the abovementioned priority has not been proposed. Specifically, in a conventional system shown in, for example, FIG. 4 (a conventional system for supplying electric power to collective housing composed of a single building through a plurality of supply lines and managing the electric power), interruption means C for an electric power distribution line not having remote interruption means are only provided in a switchboard 16 of a residence section 14 of a resident for protecting overcurrent. Hence, it has been difficult to prevent as much as possible supply interruption of a supply line having a high order of priority. It has been known that an individual resident of a collective housing may place a device described in Patent Document 1 or 2 in a residence section. However, a system capable of providing flexibility to interruption conditions for allowing the conditions to be freely set through the Internet has not been proposed.

The present applicant has proposed an electric power meter suitable for a system which supplies electric power to collective housing composed of a single or a plurality of buildings through a plurality of supply lines and manages the electric power. This electric power meter is suitable for controlling a balance between supply and demand of electric power through utilizing IT (Information Technology) (see Patent Document 9). However, any specific system has not been proposed which has this electric power meter applied to an electric power system of collective housing composed of a single or a plurality of buildings to thereby prevent as mush as possible supply interruption of a supply line having a high order of priority individually set by a resident.

Patent Document 1: Japanese Utility Model Laid-Open Publication No. Sho 57-130543 "OVERLOAD PREVENTION CONTROL DEVICE", Kitatani Electric Industry Co., Ltd.

Patent Document 2: Japanese Patent Laid-Open Publication No. Hei 3-285518 "ELECTRIC POWER CONTROL DEVICE FOR HOUSEHOLD ELECTRIC APPLIANCE", NEC Corporation Patent Document 3: Japanese Patent Laid-Open Publication No. Hei 11-341707 "REMOTE AUTOMATIC POWER SOURCE SWITCHING DEVICE", RONIKKU Co., Ltd.

Patent Document 4: Japanese Patent Laid-Open Publication No. 2000-83323 "POWER MANAGEMENT SYSTEM", MIYAMOTO ENGINEERING CO., LTD.

Patent Document 5: Japanese Patent Laid-Open Publication No. 2000-13933 "CONTROL SWITCHBOARD", NEC Engineering, Ltd.

Patent Document 6: Japanese Patent Laid-Open Publication No. 2003-319572 "ELECTRIC POWER CONTROL SYSTEM FOR INDOOR EQUIPMENT", Nippon Telegram and Telephone Corporation.

Patent Document 7: Japanese Patent Laid-Open Publication No. 2004-320849 "POWER SOURCE MANAGEMENT SYSTEM", NEC Fielding, Ltd.

Patent Document 8: Japanese Patent Laid-Open Publication No. 2004-129477"LOAD LIMITING DEVICE", Dainichi Mfg. Co., Ltd.

Patent Document 9: Japanese Patent Application No. 2004-293336"METHOD FOR MEASURING AMOUNT OF ELECTRIC POWER USAGE AND ELECTRIC POWER MANAGEMENT SYSTEM" INTELLECTUAL PROPERTY BANK CORP.

DISCLOSURE OF THE INVENTION

Problems to be Solved by the Invention

It is an object to specifically propose an electric power system technology for preventing as much as possible supply interruption of a supply line having a high order of priority, as described in Patent Documents 1 to 8, and in particular an electric power system technology applicable to collective housing composed of a single or a plurality of buildings.

Means for Solving the Problems

An electric power system for a collective area of a plurality of electric power consumers described in claim 1 is provided with a plurality of electric power distribution lines for each electric apparatus, for which an order of electric power distribution priority is set in advance, and electric power meter for measuring power consumption of each electric power distribution line, in each electric power consumer section of the collective area of a plurality of electric power consumers. The electric power system has means for remotely measuring the total amount of electric power consumption in each electric power consumer section by connecting each electric power meter with a remote management base through the Internet. The electric power system is characterized by having: means for remotely interrupting a plurality of electric power distribution lines in each electric power consumer section individually by remote operation from the remote management base; means for setting via the Internet a limit amount of electric power consumption which amount is within a maximum electric power capable of being supplied to each electric power consumer section; means for issuing an instruction for performing, by the remote interruption means, interruption of the electric power distribution lines successively in the order from an electric power distribution line which is in a current carrying state and has the lowest order of electric power distribution priority to the highest order of electric power distribution priority when a remote measurement value of the total amount of electric power consumption of the single electric power consumer section becomes equal to or more than the set limit amount of electric power consumption; and means for logging electric power data of the electric power consumption meter predetermined period of time before occurring an emergency when sending and receiving are disabled in a send-receive line of the Internet due to the emergency.

Further, an electric power system for a collective area of a plurality of electric power consumers described in claim 2 is provided with a plurality of electric power supply lines for supplying electric power from electric power source, for which an order of electric power supply priority is set in advance, and electric power meters for measuring power consumption of each electric power supply line, in each electric power consumer section of the collective area of a plurality of electric power consumers. The electric power system has means for remotely measuring the total amount of electric power consumption in each electric power consumer section by connecting each electric power meter with a remote management base through the Internet. The electric power system is characterized by having: means for remotely interrupting a plurality of electric power supply lines in each electric power consumer section individually by remote operation from the remote management base; means for setting via the Internet a limit amount of electric power consumption which amount is within a maximum electric power capable of being supplied to each electric power consumer section; means for issuing an instruction for performing, by remote interruption means, interruption of the electric power supply lines successively in the order from an electric power supply line which is in a current carrying state and has the lowest order of electric power supply priority to the highest order of electric power supply priority when a remote measurement value of the total amount of electric power consumption becomes equal to or more than a set limit amount of electric power consumption; and means for logging electric power data of the electric power consumption meter predetermined period of time before occurring an emergency when sending and receiving are disabled in a send-receive line of the Internet due to the emergency.

An electric power system for a collective area of a plurality of electric power consumers described in claim 3 is provided with a plurality of electric power supply lines for supplying electric power from electric power source, for which an order of electric power supply priority is set in advance, a plurality of electric power distribution lines for each electric apparatus, for which an order of electric power distribution priority is set in advance, and electric power meters for measuring power consumption of each electric power supply line and each electric power distribution line, in each electric power consumer section of the collective area of a plurality of electric power consumers. The electric power system has means for remotely measuring the total amount of electric power consumption in each electric power consumer section by connecting each electric power meter with a remote management base through the Internet. The electric power system is characterized by having: means for remotely interrupting a plurality of electric power supply lines in each electric power consumer section individually by remote operation from the remote management base; means for remotely interrupting a plurality of electric power distribution lines in each electric power consumer section individually by remote operation from the remote management base; means for setting via the Internet a limit amount of electric power consumption which amount is within a maximum electric power capable of being supplied to each electric power consumer section; means for issuing an instruction for performing, by the remote interruption means, interruption of the electric power supply lines successively in the order from an electric power supply line which is in a current carrying state and has the lowest order of electric power supply priority to the highest order of electric power supply priority or interruption of the electric power distribution lines successively in the order from an electric power distribution line which is in a current carrying state and has the lowest order of electric power distribution priority to the highest order of electric power distribution priority when a remote measurement value of the total amount of electric power consumption of the single electric power consumer section becomes equal to or more than the set limit amount of electric power consumption; and means for logging electric power data of the electric power consumption meter predetermined period of time before occurring an emergency when sending and receiving are disabled in a send-receive line of the Internet due to the emergency.

An electric power system for a collective area of a plurality of electric power consumers described in claim 4 is characterized by providing a server in the collective area of a plurality of electric power consumers, for collecting and summarizing sent and received data between electric power consumption meter described in one of claims 1 to 3 and the Internet.

An electric power system for a collective area of a plurality of electric power consumers described in claim 5 is characterized by the means for issuing the instruction for performing the interruption of the electric power supply lines or the electric power distribution lines, according to one of claims 1 to 4, send interruption recognition signal for recognizing to make interruption or not, before sending the interruption instruction.

Effects of the Invention

In a system which supplies electric power to collective housing composed of a single or a plurality of buildings through a plurality of supply lines and manages the electric power, supply interruption of a supply line having a high order of priority set by a resident can be prevented as much as possible.

Specifically, when the higher level system predicts a short-term increase in the demand of electric power due to air conditioning during summer by means of prediction for temperature, an instruction for saving electricity will be sent through the Internet or the like in order to suppress electric power consumption to the least necessary amount. The system of the aspects of the present invention receives the instruction for saving electricity and interrupts an electric power supply line having a low order of priority and supplying electric power at low cost. Therefore, the amount of electric power consumption of an object to which electric power is supplied through the present system can be restricted and reduced. If such measures can be taken, a wide area power failure can be prevented before it occurs. Here, the concept of the "electric power supply line having a low order of priority and supplying electric power at low cost" is related to the concept of the "quality of electric power" described in a previous application. Specifically, the "order of priority" set by a resident is reflected on the value, and the resident recognizes the value according to the order. A supplier sets electric power fees in accordance with the value. Therefore, electric power distributed and supplied through a line having a low order of priority is low cost.

Furthermore, if electric apparatuses (such as a personal computer) important for a resident of a residence to which the present system supplies electric power are used through a high-cost electric power supply line having a high order of priority, risk for individuals can be reduced. This is because the priority line is prevented from interruption as much as possible since a non-priority line is first interrupted even in the situation in which an emergency electric power failure is likely to occur. Conventionally, such measures cannot be taken so that electric power supply to important electric apparatuses such as a personal computer are interrupted as well as other unimportant devices. Thus, such problems are resolved.

Best Mode for Carrying out the Invention

Figure 1:
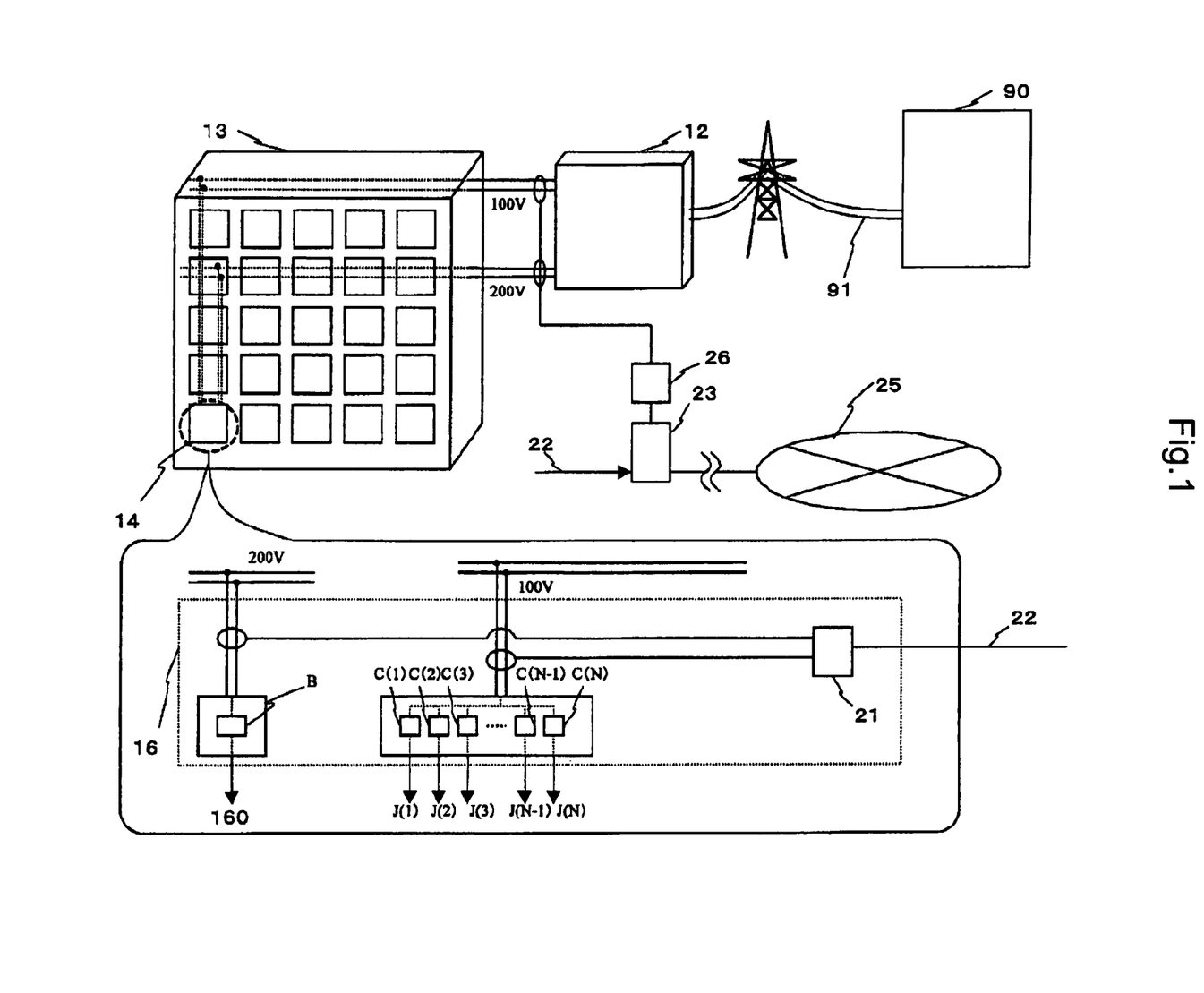
FIG. 1 is an explanatory drawing of an Example of the present invention applied to a collective housing unit 13 (the order of electric power distribution priority: claim 1).
Figure 2:
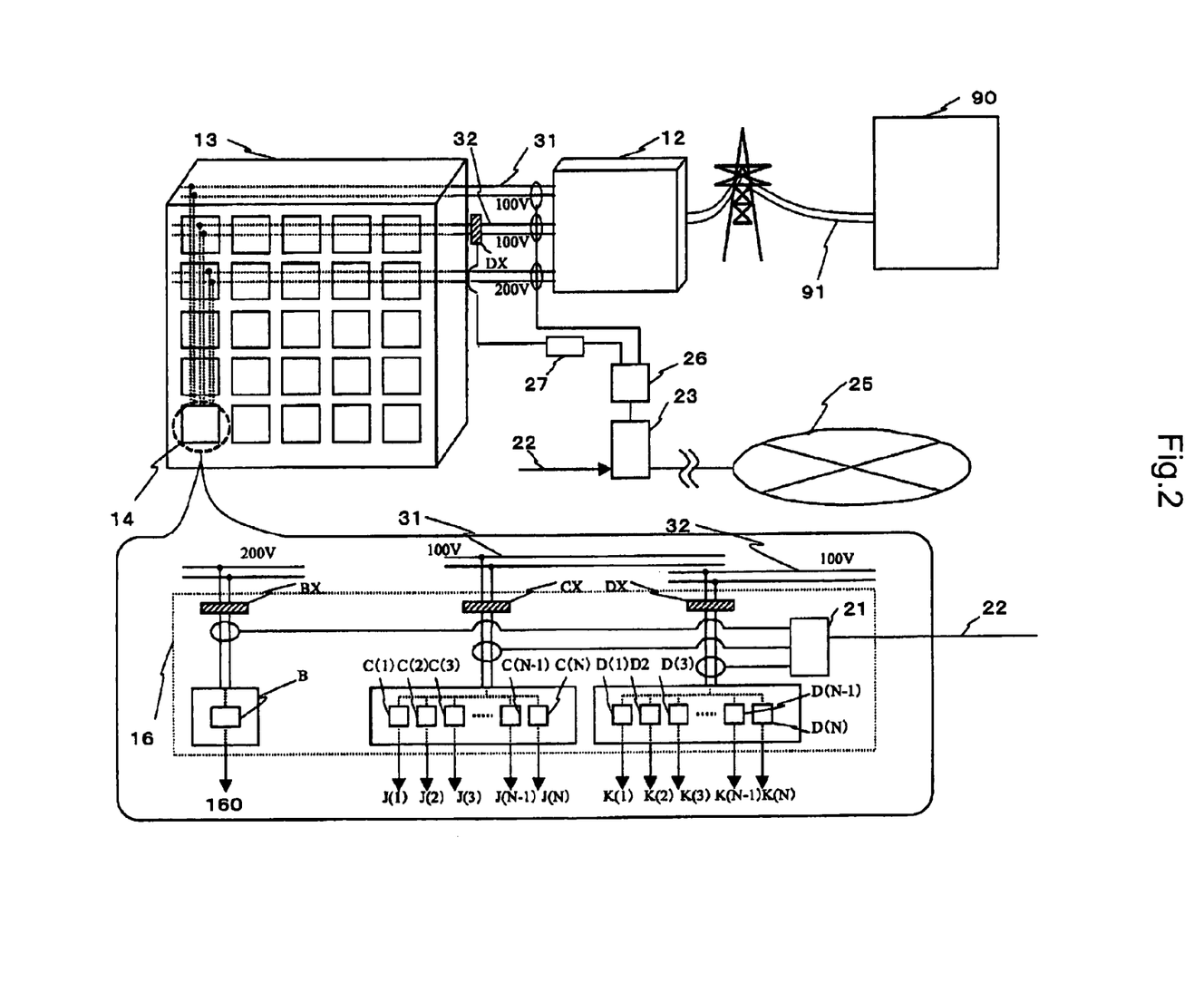
FIG. 2 is an explanatory drawing of an Example of the present invention applied to the collective housing unit 13 (the order of electric power supply priority: claim 2).

FIG. 1 is an explanatory drawing of an Example (claim 1) of the present, invention, and in this Example the invention is applied to a collective housing unit 13 in which an order of priority is assigned to electric power distribution lines. FIG. 2 is an explanatory drawing of an Example (claim 2) of the present invention, and in this Example the order of priority is further assigned to electric power supply lines in addition to the electric power distribution lines in FIG. 1. Specifically, the collective housing unit 13 corresponds to the collective area of the plurality of electric power consumers, and a single residence section 14 of the collective housing unit corresponds to the single electric power consumer section. Furthermore, an electric power measurement device 21 corresponds to the electric power meter individual for each electric power consumer section. 21 is connected to a measurement management device 23 through a measurement communication line 22 and connected to the Internet (a wide area network) 25 through the measurement management device 23.

In the single residence section 14 of the collective housing unit, J(1) is an electric apparatus having a first priority, J(2) is an electric apparatus having a second priority, J(3) is an electric apparatus having a third priority, J(N-1) is an electric apparatus having an (N-1)-th priority, J(N) is an electric apparatus having an N-th priority (an electric apparatus having the lowest priority). In addition, C(1) to C(N) are means for remotely interrupting 100 V-electric power distribution lines for J(1) to J(N), respectively. These means are means for interrupting individually the plurality of electric power distribution lines in the single electric power consumer section through remote operation from a remote management base. The description of each of the other symbols will be omitted (see DESCRIPTION OF THE SYMBOLS).

An electric power measurement control device J of the single residence section 14 of the collective housing unit has a function for measuring and remotely sending the amount of electric power and also a function for remotely interrupting a predetermined electric power distribution line. Suitably, an electric power meter disclosed by the present applicant in Patent Document 9 may be applied to 16. Examples of the electric power meter are illustrated in FIG. 3 (an example of an entire configuration diagram of the electric power measurement control device 16 employed in the present aspect), FIG. 5 (a fragmentary configuration diagram of 151 in the example of FIG. 3), and FIG. 6 (a fragmentary configuration diagram of 152 in the example of FIG. 3).

Figure 3:
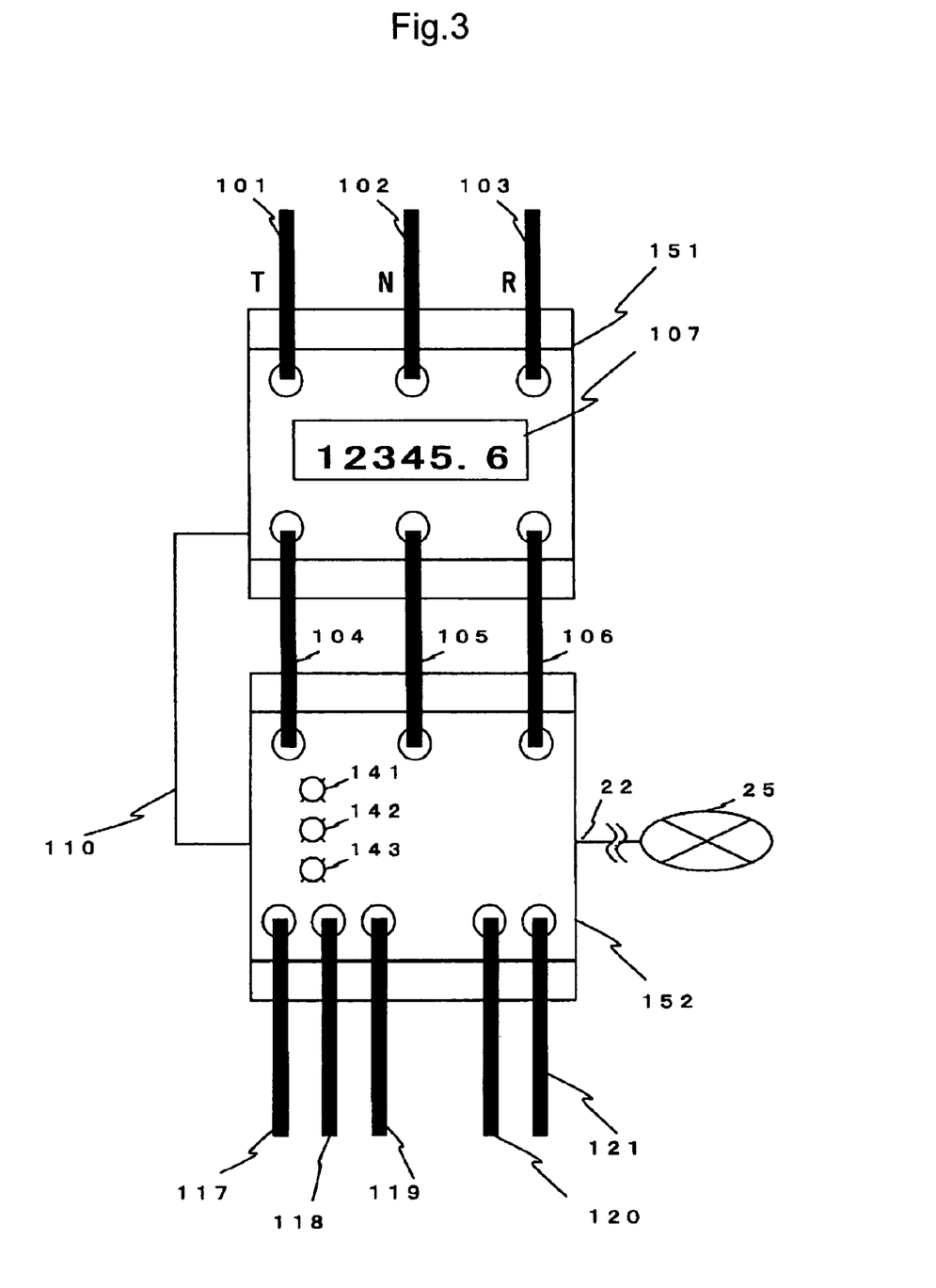
FIG. 3 is an entire configuration diagram of an example of an electric power measurement control device 16 employed in the present aspects (Patent Document 9).
Figure 5:
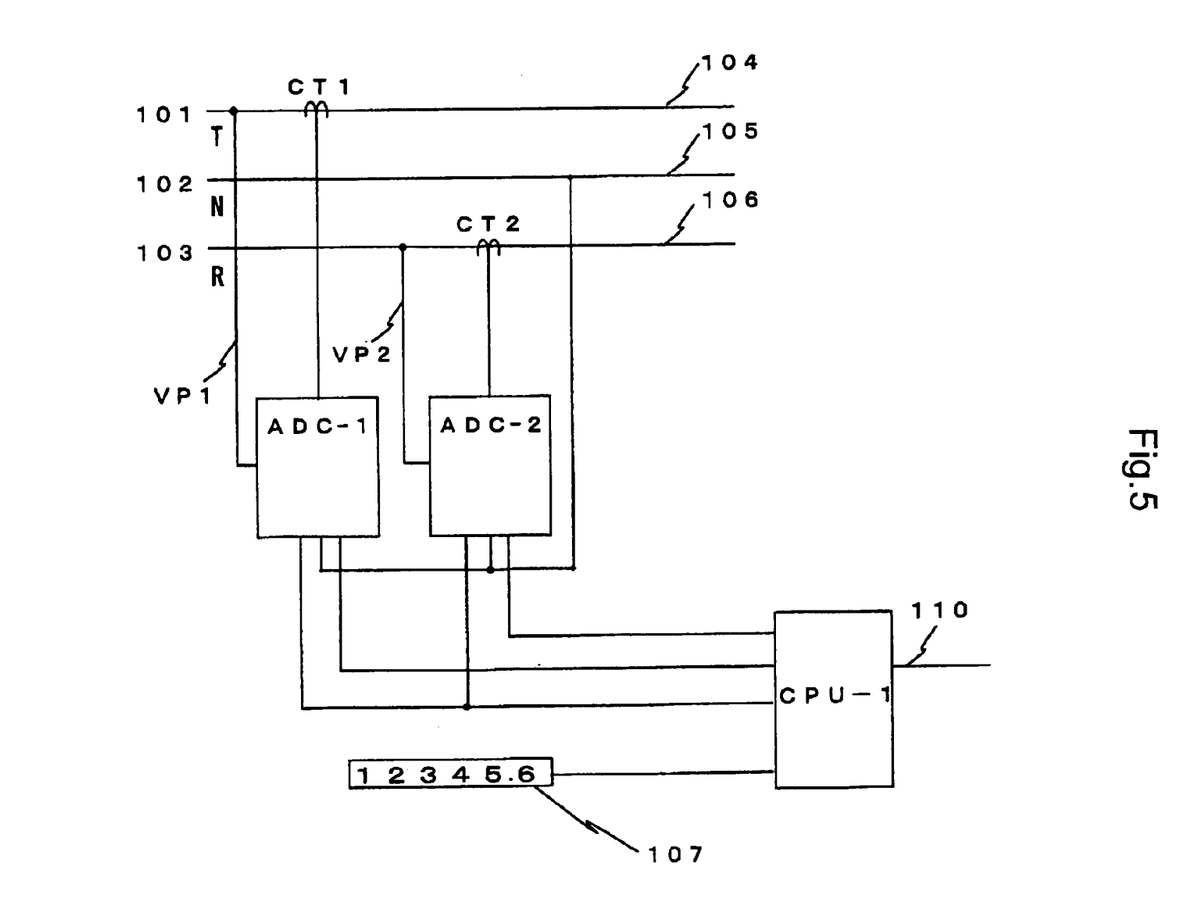
FIG. 5 is a fragmentary configuration diagram of 151 in the example of FIG. 3 (Patent Document 9).
Figure 6:
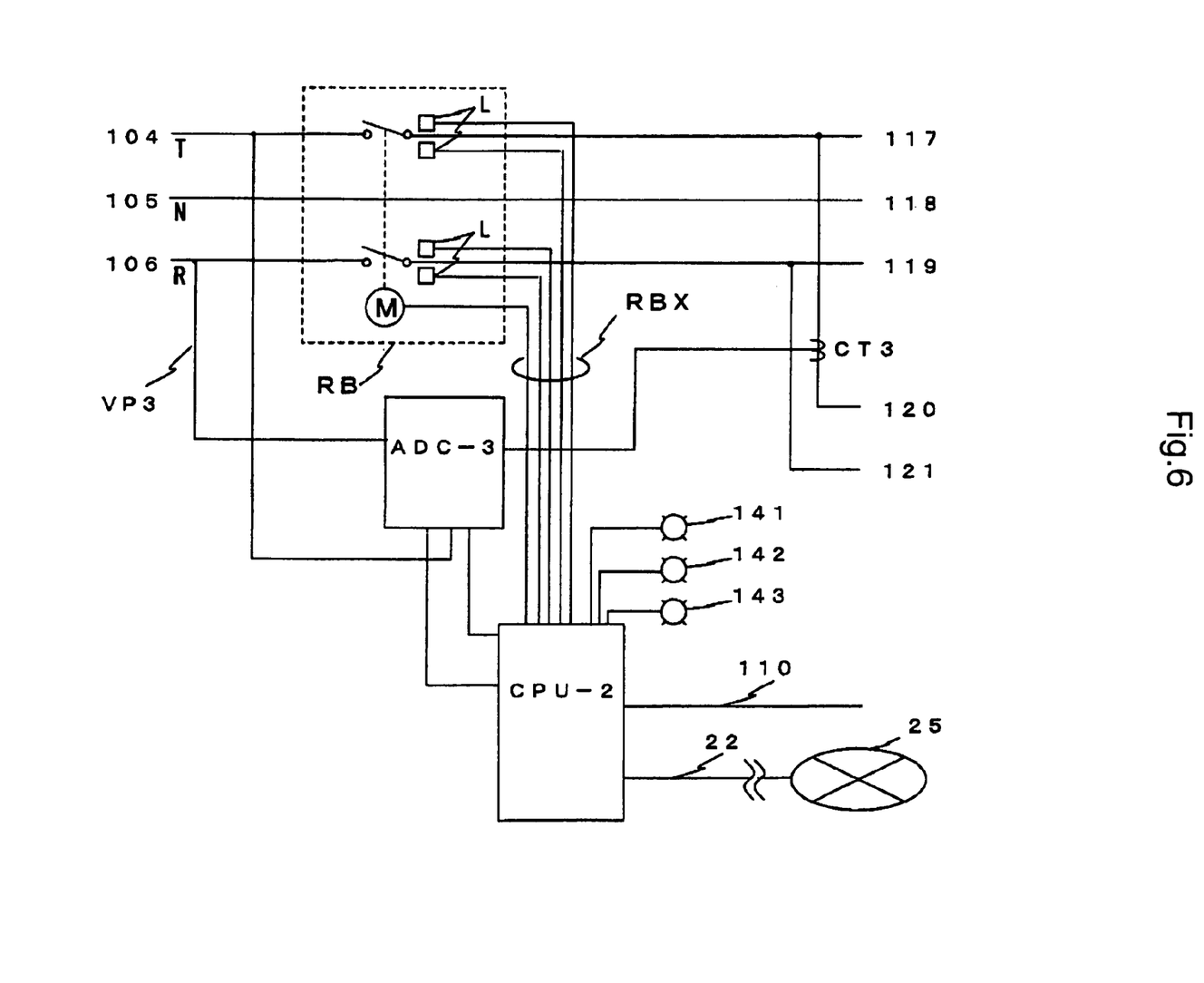
FIG. 6 is a fragmentary configuration diagram of 152 in the example of FIG. 3 (Patent Document 9).

However, the configurations of FIGS. 3, 5, and 6 are not always applicable to 16 without change. It is easy to reconfigure the abovementioned functions for measuring and remotely sending the amount of electric power and for remotely interrupting a predetermined electric power distribution line to realize 16 conforming to the specifications of measurement control. 151 (a portion measuring current and voltage in a 100 V system and having a display for the total electric power) and 152 (a portion having remote interruption means RB for remotely interrupting electric power distribution-supply lines) may be integrally configured. The description of each of the other symbols denoted in FIGS. 3, 5, and 6 will be omitted (see DESCRIPTION OF THE SYMBOLS).

The total sum of the total amounts of electric power consumption of the electric power consumer sections is measured by an electric power amount measurement device 26 shown in FIG. 1, in the upstream for electric supply to the collective housing unit 13 and the electric power amount measurement device 26 is connected to the Internet (the wide area network) 25 through the measurement management device 23. In the configuration of FIG. 1, when a remote measurement value of the total amount of electric power consumption of the single residence section 14 of the collective housing unit becomes equal to or larger than a set value of the limit amount of electric power consumption, the remote interruption can be performed successively in the order from an electric power distribution line which is in a current-carrying states and has the lowest order of electric power distribution priority. The order of priority and the limit amount of electric power consumption may be set by the resident of the single residence section through the Internet.

FIG. 2 shows an Example in which electric power is supplied to the single electric power consumer section in the collective area of the plurality of electric power consumers through a plurality of electric power supply lines from a power source and which has means for interrupting individually the plurality of electric power supply lines for the single electric power consumer section by remote operation from a remote management base. 31 is a priority (high quality) 100 V electric power supply line, and 32 is a non-priority (low quality) 100 V electric power supply line. BX is remote interruption means for a 200 V electric power supply line, CX is remote interruption means for the electric power supply line 31, DX is remote interruption means for the electric power supply line 32, and 27 is the remote interruption means for the non-priority (low quality) 100 V electric power supply line at the uppermost stream of the line. These BX, CX, DX, and 27 may be employed selectively. The description of each of the other symbols will be omitted (see DESCRIPTION OF THE SYMBOLS).

In the configuration of FIG. 2, a line having non-priority 32 can be first interrupted remotely according to the order of the preset priority (two ranks, i.e., priority 31 and non-priority 32 in FIG. 2) of the electric power supply lines described in claim 2. Furthermore, in FIG. 2, means (C(1) to C(N) and D(1) to D(N)) for individually interrupting also the plurality of electric power distribution lines in the single electric power consumer section by remote operation from the remote management base are illustrated as a combination with the configuration of FIG. 1. These may also be employed selectively.

The plurality of electric power supply lines may be composed only of the 100 V electric power supply line and the 200 V electric power supply line. For example, in the case in which the 100 V has priority and the 200 V has non-priority in the order of priority of electric power supply, when the remote measurement value of the total amount of electric power consumption is equal to or larger than a set value of the limit amount of electric power consumption, remote interruption is carried out by BX (the remote interruption means for the 200 V electric power supply line) in FIG. 2.

When the present aspects are embodied, it is necessary to address problems of malfunctions of interruption caused by a prank on the Internet or measurement error due to noise. For example, a configuration is desirable in which means for issuing an instruction for interrupting an electric power distribution line or an electric power supply line has means for sending an interruption confirmation signal before interruption through the Internet in advance of the issuance of the interruption instruction. In this configuration, a signal from the electric power transmission target can be re-received and a state can be reconfirmed whether or not the interruption is surely carried out. In addition, the state can be reconfirmed by a resident of a stand-alone house or a manager. The reconfirmation may be carried out by notifying the occurrence of the interruption to a cellular phone in advance for carrying out the interruption after the resident or the manager sends a confirmation reply. In this case, the interruption is not carried out by a mechanical system solely. Furthermore, the reconfirmation may be carried out by other method.

Furthermore, it may be assumed that sending and receiving are disabled in a send-receive line of the Internet due to a disaster. In this case, preferably, storage means for overwriting and logging the data for the electric power meter for a predetermined period of time is also provided. Specifically, this means is a function of performing backup of information of the plurality of electric power consumers in case of emergency. This data logging means is effective since, in case of emergency in which sending and receiving are disabled in a send-receive line of the Internet due to a disaster, electric power data before the disaster occurs is stored for a predetermined period of time. This exerts an effect which functions as a black box which is usable for a disaster analysis and in which the electric power consumption information of users is not lost (the black box is a recorder mounted on an airplane or the like and storing operation and communication records in case of an accident).

Preferably, the sending and receiving of data with the electric power measurement devices of the plurality of electric power consumers are centralized on a server in the collective housing unit without directly connecting to the Internet and are performed through the server. Although it is not clear in FIGS. 1 and 2, 23 is the server which is placed in a safe area in the collective housing unit and on which the sending and receiving of the data are centralized.

DESCRIPTION OF THE SYMBOLS

11 Wide area electric power distribution network
12 Device for transforming electric energy
13 Collective housing unit
14 Residence section of a resident
16 Electric power measurement control device
21 Electric power measurement device
22 Measurement communication line
23 Measurement management device
25 Internet (wide area network)
26 Electric power amount measurement device
27 Remote interruption means for a non-priority (low quality) 100 V electric power supply line at the uppermost stream of the line
31 Priority (high quality) 100 V electric power supply line
32 Non-priority (low quality) 100 V electric power supply line
90 Electric power company or power producer and supplier (PPS)
91 High voltage-special high voltage electric power transmission line
101 Hot line (tip phase: T) from an electric power supply side
102 Cold line from the electric power supply side: N
103 Hot line (ring phase: R) from the electric power supply side
104 Hot line (tip phase) connecting 151 with 152
105 Cold line connecting 151 with 152
106 Hot line (ring phase) connecting 151 with 152
107 Panel for displaying the amount of electric power
110 Bus line for data sending-receiving between CPU-1 and CPU-2
117 Hot line (tip phase) for connecting with a load
118 Cold line for connecting with a load. 117 and 118 each are a 100 V electric power distribution line, and 118 and 119 each are a second 100 V electric power distribution line.
119 Hot line (ring phase) for connecting with a load
120 Hot line (tip phase) for connecting with a load
121 Hot line (ring phase) for connecting with a load. 120 and 121 each are a 200 V electric power distribution line.
141 Action confirmation indication means
142 Indication means for management information such as no payment of outstanding fees 143 Indication means when the remote measurement value of the total electric power consumption is equal to or larger than a set value of the limit amount of electric power consumption 151 Configuration diagram of a portion measuring current and voltage in a 100 V system and having a display for the total electric power 152 Configuration diagram of a portion having remote interruption means RB for remotely interrupting electric power distribution (supply) lines 160 Load for a 200 V system ADC-1 Analog-to-digital converter (for tip phase current and voltage measurement)

ADC-2 Analog-to-digital converter (for ring phase current and voltage measurement)

B Remote interruption means for a 200 V electric power distribution line

BX Remote interruption means for a 200 V electric power supply line

C Conventional interruption means for an electric power distribution line (not having remote interruption means)

C(1) Remote interruption means for a line receiving electric power from 31 and distributing the electric power to J(1)

C(2) Remote interruption means for a line receiving electric power from 31 and distributing the electric power to J(2)

C(3) Remote interruption means for a line receiving electric power from 31 and distributing the electric power to J(3)

C(N-1) Remote interruption means for a line receiving electric power from 31 and distributing the electric power to J(N-1)

C(N) Remote interruption means for a line receiving electric power from 31 and distributing the electric power to J(N)

CPU-1 First computation unit for computing the total amount of electric power

CPU-2 Second computation unit for computing the total amount of electric power

CT1 Current converter (for measurement of tip phase current)

CT2 Current converter (for measurement of ring phase current)

CT3 Current converter (for measurement of current of the 200 V system)

CX Remote interruption means for the electric power supply line 31

D(1) Remote interruption means for a line receiving electric power from 32 and distributing the electric power to K(1)

D(2) Remote interruption means for a line receiving electric power from 32 and distributing the electric power to K(2)

D(3) Remote interruption means for a line receiving electric power from 32 and distributing the electric power to K(3)

D(N-1) Remote interruption means for a line receiving electric power from 32 and distributing the electric power to K(N-1)

D(N) Remote interruption means for a line receiving electric power from 32 and distributing the electric power to K(N)

DX Remote interruption means for the electric power supply line 32

J(1) Electric apparatus having first priority

J(2) Electric apparatus having second priority

J(3) Electric apparatus having third priority

J(N-1) Electric apparatus having (N-1)-th priority

J(N) Electric apparatus having N-th priority (electric apparatus having the lowest priority)

K(1) Electric apparatus having first priority

K(2) Electric apparatus having second priority

K(3) Electric apparatus having third priority

K(N-1) Electric apparatus having (N-1)-th priority

K(N) Electric apparatus having N-th priority (electric apparatus having the lowest priority)

L Action detector (limit switch) for interruption and power-on actions of RB

LX Electric apparatus to which electric power is supplied by a conventional system and an order of priority cannot be assigned M Actuator (contactor driving motor) for an interruption action of RB RB Remote interruption means for remotely interrupting an electric power distribution (supply) line RBX Sending-receiving line for a remote interruption signal to RB and a status signal (connection or interruption) of RB VP1 Measurement line for potential difference measurement (for tip phase voltage measurement)

VP2 Measurement line for potential difference measurement (for ring phase voltage measurement)

VP3 Measurement line for potential difference measurement (for measurement of voltage of a basic voltage load alone)

The invention claimed is:

1. An electric power system for a collective area of a plurality of electric power consumers provided with a plurality of electric power distribution lines for each electric apparatus, for which an order of electric power distribution priority is set in advance, and electric power meter for measuring power consumption of each electric power distribution line, in each electric power consumer section of the collective area of a plurality of electric power consumers, means for remotely measuring the total amount of electric power consumption in each single electric power consumer section by connecting each electric power meter with a remote management base through the Internet, the electric power system is characterized by comprising:
means for remotely interrupting a plurality of electric power distribution lines in each electric power consumer section individually by remote operation from the remote management base;
means for setting via the Internet a limit amount of electric power consumption which amount is equal to or less than a maximum electric power capable of being supplied to each electric power consumer section;
means for issuing an instruction for performing, by the remote interruption means, interruption of the electric power distribution lines successively in the order from an electric power distribution line which is in a current carrying state and has the lowest order of electric power distribution priority to the highest order of electric power distribution priority when a remote measurement value of the total amount of electric power consumption becomes equal to or larger than the set value of the limit amount of electric power consumption; and
means for logging electric power data of the electric power consumption meter predetermined period of time before occurring an emergency when sending and receiving are disabled in a send-receive line of the Internet due to the emergency.

2. An electric power system for a collective area of a plurality of electric power consumers characterized by providing a server in the collective area of a plurality of electric power consumers, for collecting and summarizing sent and received data between electric power consumption meter described in claim 1 and the Internet.

3. An electric power system for a collective area of a plurality of electric power consumers according to claim 1, wherein the means for issuing the instruction for performing the interruption of the electric power supply lines or the electric power distribution lines send interruption recognition signal for recognizing to make interruption or not, before sending the interruption instruction.

4. An electric power system for a collective area of a plurality of electric power consumers provided with a plurality of electric power supply lines for supplying electric power from electric power source, for which an order of electric power supply priority is set in advance, and electric power meter for measuring power consumption of each electric power supply line, in each electric power consumer section of the collective area of a plurality of electric power consumers, and means for remotely measuring the total amount of electric power consumption in each electric power consumer section by connecting each electric power meter with a remote management base through the Internet, the electric power system is characterized by having:

means for remotely interrupting a plurality of electric power supply lines in each electric power consumer section individually by remote operation from the remote management base;

means for setting via the Internet a limit amount of electric power consumption which amount is within a maximum electric power capable of being supplied to each electric power consumer section;

means for issuing an instruction for performing, by remote interruption means, interruption of the electric power supply lines successively in the order from an electric power supply line which is in a current carrying state and has the lowest order of electric power supply priority based on the order of electric power supply priority to the highest order of electric power supply priority when a remote measurement value of the total amount of electric power consumption becomes equal to or larger than the set value of the limit amount of electric power consumption; and means for logging electric power data of the electric power consumption meter predetermined period of time before occurring an emergency when sending and receiving are disabled in a send-receive line of the Internet due to the emergency.

5. An electric power system for a collective area of a plurality of electric power consumers provided with a plurality of electric power supply lines for supplying electric power from electric power source, for which an order of electric power supply priority is set in advance, a plurality of electric power distribution lines for each electric apparatus, for which an order of electric power distribution priority is set in advance, electric power meters for measuring power consumption of each electric power supply line and each electric power distribution line, in each electric power consumer section of the collective area of a plurality of electric power consumers, and means for remotely measuring the total amount of electric power consumption in each electric power consumer section by connecting each electric power meter with a remote management base through the Internet, the electric power system is characterized by having:

means for remotely interrupting a plurality of electric power supply lines in each electric power consumer section individually by remote operation from the remote management base;

means for remotely interrupting a plurality of electric power distribution lines in each electric power consumer section individually by remote operation from the remote management base;

means for setting via the Internet a limit amount of electric power consumption which amount is within a maximum electric power capable of being supplied to each electric power consumer section; means for issuing an instruction for performing, by the remote interruption means, interruption of the electric power supply lines successively in the order from an electric power supply line which is in a current carrying state and has the lowest order of electric power supply priority to the highest order of electric power supply priority or interruption of the electric power distribution lines successively in the order from an electric power distribution line which is in a current carrying state and has the lowest order of electric power distribution priority to the highest order of electric power distribution priority when a remote measurement value of the total amount of electric power consumption of the single electric power consumer section becomes equal to or more than the set limit amount of electric power consumption; and means for logging electric power data of the electric power consumption meter predetermined period of time before occurring an emergency when sending and receiving are disabled in a send-receive line of the Internet due to the emergency.

* * * * *

UNITED STATES PATENT AND TRADEMARK OFFICE
CERTIFICATE OF CORRECTION

| | | |
|---|---|---|
| PATENT NO. | : 7,412,304 B2 | Page 1 of 1 |
| APPLICATION NO. | : 10/593980 | |
| DATED | : August 12, 2008 | |
| INVENTOR(S) | : Yasuhiro Uenou | |

It is certified that error appears in the above-identified patent and that said Letters Patent is hereby corrected as shown below:

Cover page, item (30), please add the following:

--(30)    Foreign Application Priority Data
        March 25, 2004    (JP) .................... 2004-124815--

Signed and Sealed this

Seventh Day of October, 2008

JON W. DUDAS
*Director of the United States Patent and Trademark Office*